March 23, 1954 R. A. PLUNK 2,673,079
EVAPORATIVE COOLER FOR MOTOR VEHICLES
Filed Dec. 15, 1950 2 Sheets-Sheet 1

Inventor
Rowe A. Plunk
By
Ahley & Ahley
ATTORNEYS

March 23, 1954 — R. A. PLUNK — 2,673,079
EVAPORATIVE COOLER FOR MOTOR VEHICLES
Filed Dec. 15, 1950 — 2 Sheets-Sheet 2

Inventor
Rowe A. Plunk
By Ahley & Ahley
ATTORNEYS

Patented Mar. 23, 1954

2,673,079

UNITED STATES PATENT OFFICE 2,673,079

EVAPORATIVE COOLER FOR MOTOR VEHICLES

Rowe A. Plunk, Midland, Tex.

Application December 15, 1950, Serial No. 200,950

2 Claims. (Cl. 261—92)

This invention relates to new and useful improvements in evaporative coolers for motor vehicles.

One object of the invention is to provide an improved evaporative cooler for a motor vehicle which is adapted to be mounted immediately in front of the radiator of the vehicle whereby the cooler may be permanently installed without detracting from the appearance of said vehicle or interfering with the operation and use thereof.

Another object of the invention is to provide an improved evaporative cooler for a motor vehicle which is such construction that the same may be connected readily to the fresh air ducts of the vehicle for directing cooled air thereinto and which has a rotatable element of porous material immersed in water for cooling the air.

A particular object of the invention is to provide an improved evaporative cooler, of the character described, having novel means for imparting rotation to the porous element so as to maintain the same in a saturated condition.

An important object of the invention is to provide an improved evaporative cooler, of the character described, wherein the rotatable element includes a porous cylinder extending transversely of the vehicle and having an axial bore communicating with the air ducts, the cylinder being mounted in a complementary casing having an inlet opening in the front portion of its side wall whereby a considerable portion of said cylinder is exposed to the air passing through the vehicle grille.

A further object of the invention is to provide an improved evaporative cooler, of the character described, wherein a deflector overlies the inlet opening of the casing for directing air thereinto and wherein the deflector may be adjustable in accordance with the flow of air so as to permit by-passing of a portion of said air and vary the amount directed into said casing.

A construction designed to carry out the invention will be hereinafter described together with other features of the invention.

The invention will be more readily understood from a reading of the following specification and by reference to the accompanying drawings, wherein examples of the invention are shown, and wherein:

Fig. 2 is a longitudinal, sectional view of the evaporative cooler,

Fig. 3 is an enlarged, transverse, vertical, sectional view of the cooler,

Figure 1:
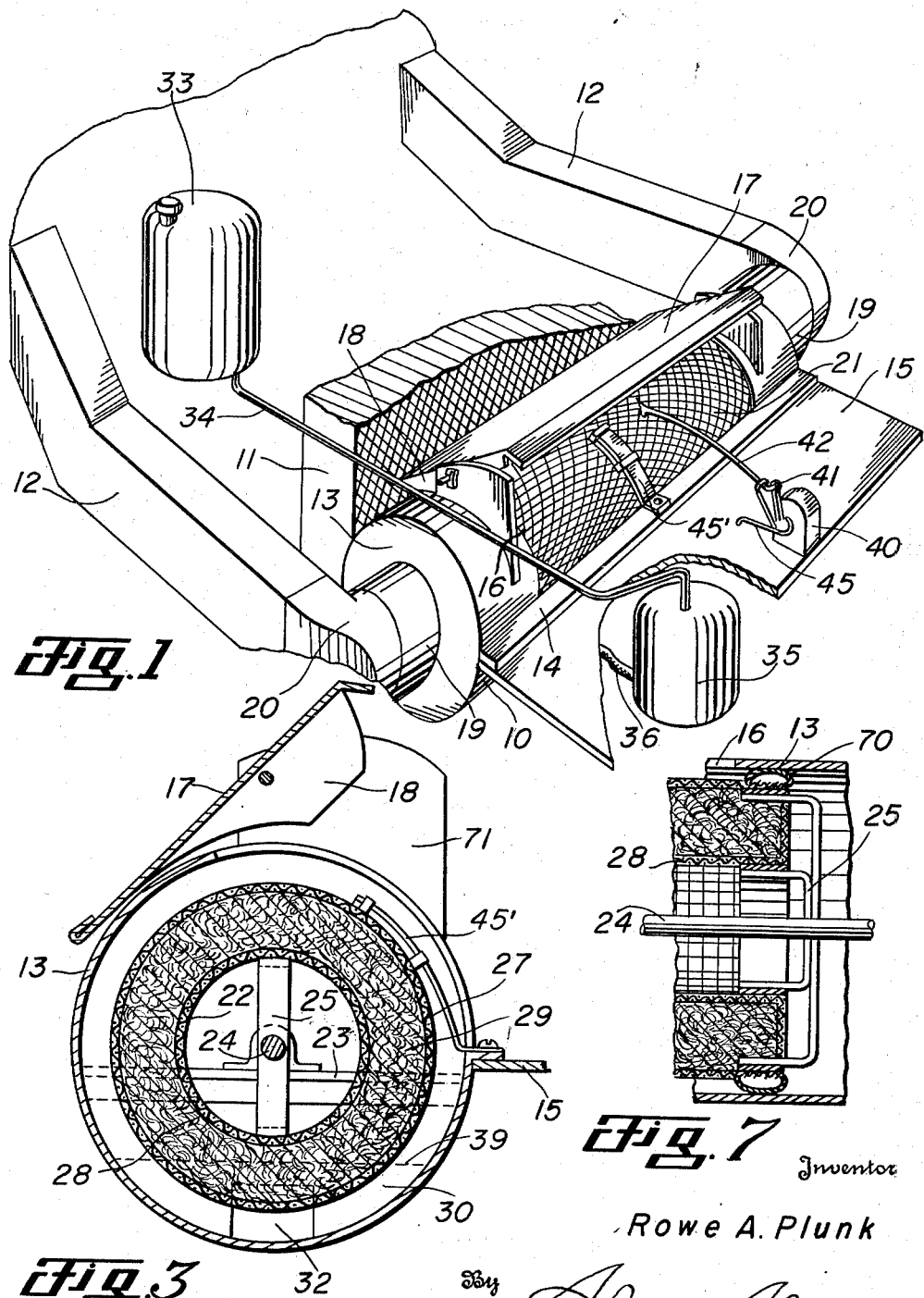
Fig. 1 is a perspective view of an evaporative cooler constructed in accordance with the invention and mounted on a motor vehicle.

Fig. 4 is a transverse, vertical, sectional view showing the motor for rotating the porous cylinder of the cooler, the float valve for maintaining the water level and the deflector in by-passing position, Fig. 5 is a vertical, sectional view of one end of a modified form of cooler, Fig. 6 is a transverse, vertical, sectional view of the modification shown in Fig. 5, and Fig. 7 is a vertical, sectional view of one end of a cooler having a modified seal.

In the drawings, the numeral 10 designates an evaporative cooler which is adapted to be mounted immediately in front of the radiator 11 of a motor vehicle for cooling or reducing the temperature of the air admitted to the interior or passenger compartment (not shown) of the vehicle through conventional fresh air ducts 12. The cooler includes a substantially cylindrical, horizontal housing or casing 13 of sheet metal which extends transversely of the vehicle in substantially parallel, forward relation to the radiator 11 and which is of a length substantially equal to the width of said radiator. A radial flange or bar 14 extends longitudinally of the forward portion of the casing 13 for securing the cooler in a horizontal, transversely-extending supporting plate or member 15 which may be the usual splash pan or guard that extends forwardly from the lower portion of the radiator to an ornamental grille (not shown). As shown in Figs. 1, 3 and 4, the longitudinal axis of the cylinder is in substantial alinement with the plate 15 whereby approximately only one-half of said casing projects above said plate and only the extreme lower portion of the radiator is obstructed. A large, rectangular, inlet opening 16 is formed in the upper, forward portion of the casing above the flange 14 and extends substantially throughout the length of said casing for admitting air to the interior thereof. In order to assist the flow of air through the opening 16 into the casing, a co-extensive deflector or shield 17 overlies said casing and the upper portion of said opening. A flange 18 depends from each end of the shield 17 for connecting the same in spaced relation to the casing and said shield preferably is adjustable in accordance with the flow of air as will be hereinafter explained. The ends of the casing are provided with outlet openings in the form of flanged collars or fittings 19 which are connected to the fresh air ducts 12 by suitable elbows 20 whereby the air admitted by the inlet opening 16 is directed to said ducts.

For cooling the air, a substantially cylindrical co-extensive element 21 in the form of a sleeve or tube is rotatably mounted in the casing and has an axial bore or opening 22 in substantial alinement with the axes of the collars 19. A horizontal angle bar 23 extends transversely across the inner surface of each collar 19 for rotatably supporting an axial shaft 24 upon which the element 21 is secured by means of U-shaped brackets or yokes 25. The latter are positioned in the bore 22 and are connected to the element by flanged end plates or collars 26. As is most clearly shown in Fig. 2, the element is porous and has foraminous or perforated outer and inner peripheral walls 27 and 28 of hardware cloth or other large mesh or reticulated material extending between and secured to the outer and inner peripheries of the collars 26. A porous or loose material 29, such as excelsior, fills the annular space between the walls 27 and 28 and is adapted to be moistened or saturated by water which is maintained in the lower portion of the casing. In order to prevent the air from by-passing the material 29, annular externally-flanged plates or sealing members 30 are secured in the ends of the casing adjacent the opening 16 and have the outer ends of the collars 26 journaled therein.

Washers 31, of felt or other suitable material, are confined between the end plates and collars for sealing off therebetween. If desired, an opening 32 may be formed in the lower portion of each end plate 30 for increasing the water capacity of the casing. In some instances, it is desirable to separate the ends of the bore 22 by means of a solid plate or disk 22, such as when the blower of the motor vehicle is connected to only one duct.

Water is supplied to the lower portion of the casing from a receptacle or vessel 33 mounted in the motor compartment of the vehicle. A flexible tube or conduit 34 extends from the lower portion of the vessel 33, which is disposed slightly above the casing, to a float chamber 35 mounted below the plate 15 forwardly of said casing. Communication between the lower portions of the casing and float chamber 35 is established by a flexible tube or conduit 36. A float-actuated valve 37 is mounted in the chamber 35 for engaging the lower end of the tube 34 to maintain a desired level of water in said chamber and the casing as shown by the dotted lines 38 and 39 (Fig. 4). Since a portion of the element 21 extends below the water level 39, a portion of the porous material 29 is immersed in the water and all of said material is saturated upon rotation of said element. Thus, the air passing through the material in flowing from the inlet opening 16 through the bore 22 and outlet collars 19 into the ducts 12 is cooled due to the evaporation of the moisture in said material.

Intermittent drive means is provided for continually imparting rotation to the element 21, and preferably includes an electric or vacuum motor 40 of the oscillating or crank type mounted upon the plate 15 with its axis of oscillation parallel to the axis of rotation of said element. The motor 40 includes a crank arm 41 which is adapted to be oscillated or swung back and forth in an arc about the horizontal axis of said motor. A pawl lever or rod 42 has one end pivotally connected to the arm 41 and extends rearwardly therefrom into overlying relation to the element. The rear extremity of the lever 42 is bent or curved upwardly as shown by the numeral 43 and a hook or pawl 44 depends inwardly of said extremity for engagement with the reticulated outer wall 27 of the element. A spring 45 is provided for resiliently holding the pawl 44 in engagement with the element wall during clockwise oscillation of the arm 41 and forward reciprocation of the lever 42 and to permit rearward reciprocation of said lever relative to said element upon counter-clockwise swinging of said arm. Counter-clockwise or reverse rotation of the element is prevented by a resilient or spring-pressed brake member 45 mounted upon the flange 14 and directed rearwardly into engagement with the element wall 27. It is manifest that the reticulated outer wall of the element functions as a ratchet and coacts with the pawl 44 to provide a pawl and ratchet drive connection between the motor and element to intermittently rotate said element in a clockwise direction. Thus, the porous material 29 is saturated and maintained in a moistened condition. It is noted that the rotation of the element may be relatively slow and that the speed as well as the actuation of the motor may be controlled by suitable switch (not shown).

In Figs. 5 and 6, a slightly modified form of evaporative cooler is shown and includes a similar casing 46 having a similar element 47 rotatably supported therein upon an axial shaft 48. The casing 46 is of appreciably greater length than the element 47 and has its end walls 49 spaced therefrom. An outlet opening is provided by an outwardly and upwardly inclined collar or elbow 50 of relatively large diameter at each end of the casing for connection with the fresh air ducts 12. Air is admitted to the casing through an inlet opening 51, similar to the opening 16, and a similar shield 52 overlies the opening 51. In addition to outer and inner cylindrical walls 53 and 54 of hardware cloth or other suitable foraminous or reticulated material, which are similar to the walls 27 and 28, an annular wall 55 of the same material is provided at each end of the element 47. Annular, external and internal, peripheral collars or rings 56 and 57 are secured to each end of the walls 53 and 54, respectively, and are fastened to the shaft by alined and nested, U-shaped brackets or yokes 58 and 59 which have their arms directed inwardly and engaged within the collars. Thus, the element has an axial bore 60 in open communication with the outlet collars 50. Porous material 61, similar to the material 29, fills the annular space between the porous walls of the element. For sealing off between the inlet opening and the outlet collars, an annular packing ring or member 62, of rubber or other elastic or suitable material, encircles each external end collar 56 of the element and has a radial flange 63 for sealingly engaging the inner surface of the casing. The ends of the shaft 48 are journaled in the end walls 49 and a suitable spacer 64 is confined between each end wall and the outer bracket 58 of the element for maintaining said element in position. Water is supplied to the casing 46 by flexible tube or conduit 65 and a nipple 66 from a suitable source, such as the vessel 33. The nipple 66 extends uprightly adjacent one of the end walls 49 and is supported by suitable U-shaped bracket 67 with its lower end above the bottom of the casing. A float-actuated valve 68 is pivotally mounted below the nipple for co-acting with the lower end thereof to maintain a desired level of water in the casing as shown by the dotted line 69. The other elements are identical to that described hereinbefore with the exception of the brake member 46 which may be omitted since the flange 63 of the packing ring 62 frictionally engages the casing and resists rotation of the element.

If desired, a fibrous seal 70 may be substituted for the packing ring as shown in Fig. 7 to permit limited increased air flow and cooling by picking up moisture. Due to the large diameter of the outlet collars and the absence of end plates, the entire ends of the rotatable element, as well as its bore, are in open communication with said collars whereby the capacity of the cooler is increased for handling a larger volume of air.

The shields or deflectors 17 and 52 preferably are adjustable in accordance with the flow of air and the flanges 18 of said shield 17 are pivotally connected to upright end members 71 whereby the shield may swing or pivot relative to the casing 13 and its inlet opening 16. As shown in Fig. 3, the rear portion of the shield engages the casing to direct substantially all of the air into the opening, such as at slow speeds of the motor vehicle. Upon faster speeds, the air striking the shield swings it clockwise (Fig. 4) so as to by-pass or direct a portion of said air toward the vehicle radiator to prevent overloading of the cooler and overheating of the vehicle. The shield 52 is arranged in the same manner or may be manually adjustable.

From the foregoing, it is believed to be readily apparent that an evaporative cooler of novel construction has been provided. The cooler may be mounted readily on a motor vehicle for cooling the air admitted to the interior or passenger compartment of the vehicle. Although the cooler is primarily adapted for use on a vehicle having fresh air ducts, it is manifest that the ducts could be added to vehicles lacking the same. The installation of the cooler is permanent and does not mar or detract from the appearance or interfere with the operation of the vehicle.

It is noted that rotation of the element and the supplying of water are independent of movement of the vehicle and are automatically controlled irrespective of vehicle movement. Due to the mounting of the cooler, the same is exposed to a large volume of fresh air and the flow of such air maintains the porous material near the wet bulb temperature. Since fast rotation of the element is not required in order to keep the material saturated, the motor 40 may be relatively small and inexpensive and require little power for operation.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. In combination with the fresh air ducts of a motor vehicle, an evaporative cooler including, a substantially cylindrical horizontally-extending casing containing water and having a longitudinal air inlet opening in its side wall, the casing having air outlet openings in its end walls communicating with the fresh air ducts, a substantially co-extensive element rotatably mounted in said casing and partially immersed in the water, the element having inner and outer cylindrical foraminous walls, porous material confined between the walls, the outer element wall being exposed to the inlet opening, said element having an axial bore in communication with the outlet openings, annular sealing means between the ends of said casing and element for sealing off said inlet opening from said outlet openings, a motor, and a pawl lever connected to and reciprocated by the motor and drivingly engaging the outer foraminous wall of said element for continually imparting intermittent rotation thereto to moisten the porous material.

2. In combination with the fresh air ducts of a motor vehicle, an evaporative cooler including, a substantially cylindrical horizontally-extending casing containing water and having a longitudinal air inlet opening in its side wall, the casing having air outlet openings in its end walls communicating with the fresh air ducts, a substantially coextensive element rotatably mounted in said casing and partially immersed in the water, the element having inner and outer cylindrical foraminous walls, porous material confined between the walls, the outer element wall being exposed to the inlet opening, said element having an axial bore in communication with the outlet openings, annular sealing means between the ends of said casing and elements for sealing off said inlet opening from said outlet openings, and intermittent drive means for continually rotating said element to moisten the porous material, the intermittent drive means including a reciprocable member in driving engagement with the outer foraminous wall of said element.

ROWE A. PLUNK.

References Cited in the file of this patent

UNITED STATES PATENTS

| Number | Name | Date |
|--------|------|------|
| 302,163 | Saladin | July 15, 1884 |
| 1,783,181 | Birkholz | Dec. 2, 1930 |
| 1,786,208 | Jordahl | Dec. 23, 1930 |
| 1,864,201 | Kegerreis et al. | June 21, 1932 |
| 2,157,974 | Wentz | May 9, 1939 |
| 2,159,516 | Ball | May 23, 1939 |
| 2,230,020 | Webster | Jan. 28, 1941 |
| 2,524,697 | Epperly | Oct. 3, 1950 |